US012198444B2

(12) United States Patent
Candas et al.

(10) Patent No.: US 12,198,444 B2
(45) Date of Patent: Jan. 14, 2025

(54) METHOD FOR CONTROLLING THE POSITIONING OF A MOTOR VEHICLE ON A TRAFFIC LANE

(71) Applicants: RENAULT s.a.s., Boulogne-Billancourt (FR); NISSAN MOTOR CO., LTD., Yokohama-shi (JP)

(72) Inventors: Christophe Candas, Aubevoye (FR); Jerome Kunc, La Chapelle Longueville (FR)

(73) Assignees: AMPERE S.A.S., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 407 days.

(21) Appl. No.: 17/439,174

(22) PCT Filed: Mar. 20, 2020

(86) PCT No.: PCT/EP2020/057885
§ 371 (c)(1),
(2) Date: Sep. 14, 2021

(87) PCT Pub. No.: WO2020/193438
PCT Pub. Date: Oct. 1, 2020

(65) Prior Publication Data
US 2022/0165071 A1   May 26, 2022

(30) Foreign Application Priority Data
Mar. 28, 2019 (FR) ...................................... 19 03280

(51) Int. Cl.
*G06V 20/56* (2022.01)
*B60K 35/28* (2024.01)
(Continued)

(52) U.S. Cl.
CPC ........... *G06V 20/588* (2022.01); *B60W 30/12* (2013.01); *G06V 20/58* (2022.01);
(Continued)

(58) Field of Classification Search
CPC ..... G06V 20/588; G06V 20/58; B60W 30/12; B60W 2420/42; B60W 2552/10;
(Continued)

(56) References Cited

U.S. PATENT DOCUMENTS

2011/0015850 A1\* 1/2011 Tange .................... B60W 30/12
701/116
2015/0151725 A1\* 6/2015 Clarke .................... G01C 21/30
701/28
(Continued)

FOREIGN PATENT DOCUMENTS

EP    3 360 746 A1    8/2018

OTHER PUBLICATIONS

International Search Report issued on Jun. 22, 2020 in PCT/EP2020/057885 filed Mar. 20, 2020, 2 pages.

*Primary Examiner* — John W Lee
(74) *Attorney, Agent, or Firm* — Oblon, McClelland, Maier & Neustadt, L.L.P.

(57) ABSTRACT

A method is for controlling the positioning of a motor vehicle on a road including several traffic lanes defined laterally by road marking lines. The method includes receiving a signal originating from a camera equipping the vehicle, analyzing the signal in order to detect the road marking lines, identifying, according to a predefined classification of the types of road marking lines, the type of lines detected defining the vehicle's current traffic lane, determining characteristics of the current traffic lane depending on the type of road marking lines defining it and, if the current traffic lane is one of the left-most lane or the right-most lane in the (Continued)

Figure 1:
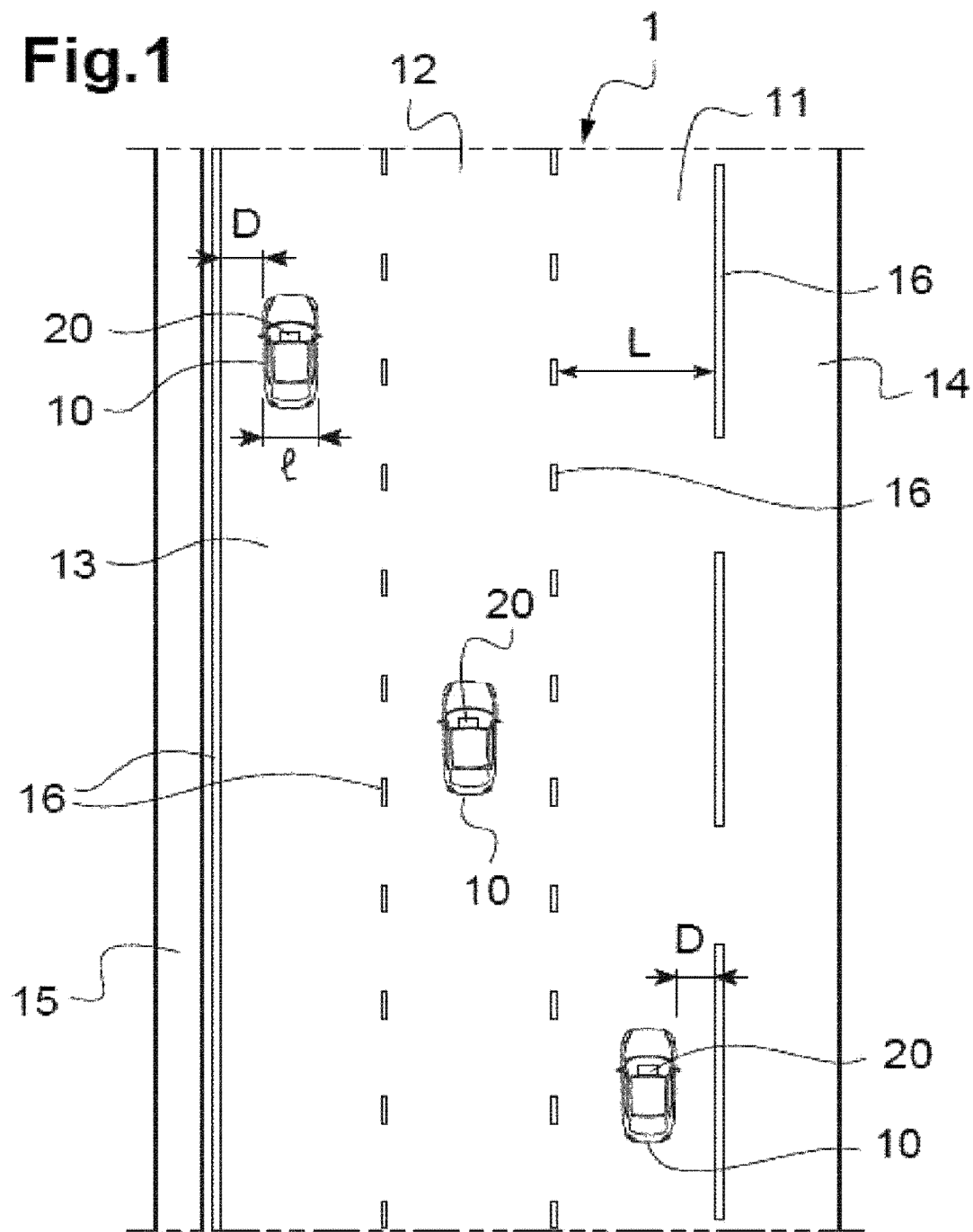

vehicle's direction of travel, shifting the vehicle towards the distal edge of the road relative to the central axis of the current traffic lane.

12 Claims, 3 Drawing Sheets

(51) Int. Cl.
| | |
|---|---|
| *B60W 30/12* | (2020.01) |
| *B60W 30/18* | (2012.01) |
| *B60W 40/06* | (2012.01) |
| *B60W 40/105* | (2012.01) |
| *B60W 60/00* | (2020.01) |
| *G06V 20/58* | (2022.01) |
| *G08G 1/16* | (2006.01) |

(52) U.S. Cl.
CPC ... *B60W 2420/403* (2013.01); *B60W 2552/10* (2020.02); *B60W 2552/53* (2020.02)

(58) Field of Classification Search
CPC ....... B60W 2552/53; B60W 2554/402; B60W 30/18163; B60W 40/06; B60W 40/105; B60W 60/001; B60W 2520/10; G08G 1/167; B60K 2370/175; B60K 2370/176
See application file for complete search history.

(56) References Cited

U.S. PATENT DOCUMENTS

| | | |
|---|---|---|
| 2015/0151742 A1 | 6/2015 | Clarke et al. |
| 2015/0151751 A1 | 6/2015 | Clarke et al. |
| 2015/0151753 A1 | 6/2015 | Clarke et al. |
| 2015/0153735 A1 | 6/2015 | Clarke et al. |
| 2015/0367850 A1 | 12/2015 | Clarke et al. |
| 2016/0052514 A1 | 2/2016 | Clarke et al. |
| 2016/0167650 A1 | 6/2016 | Clarke et al. |
| 2016/0229410 A1 | 8/2016 | Clarke et al. |
| 2016/0347322 A1 | 12/2016 | Clarke et al. |
| 2018/0118264 A1 | 5/2018 | Adiprasito et al. |
| 2019/0248372 A1 | 8/2019 | Clarke et al. |
| 2019/0344787 A1 | 11/2019 | Pietzsch et al. |
| 2020/0094839 A1 | 3/2020 | Clarke et al. |
| 2020/0108834 A1 | 4/2020 | Clarke et al. |

* cited by examiner

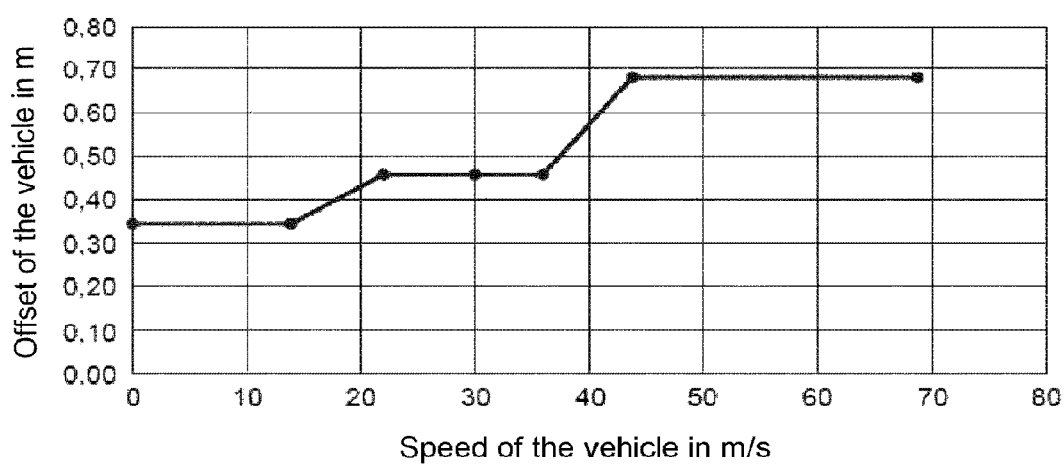

METHOD FOR CONTROLLING THE POSITIONING OF A MOTOR VEHICLE ON A TRAFFIC LANE

The invention relates to a method and to a device for controlling the positioning of a motor vehicle in a traffic lane. The invention is applied to particular advantage in the implementation of systems for managing the autonomy level of self-driving motor vehicles, for which it is essential to be able to reliably control the positioning of the vehicle in its surroundings.

The problem of positioning a vehicle in its traffic lane is nowadays at the heart of the first levels of autonomy of vehicles allowing phases of autonomous driving, that is to say during which they are driven automatically, without the driver acting on the steering wheel or the pedals. In particular, on the freeway and/or on express lanes (roadways separated by a central reservation), in autonomous or semi-autonomous mode, a current strategy for controlling the lateral positioning of the vehicle in its traffic lane consists in positioning the vehicle substantially in the middle of a lane. In a real driving situation, this strategy may lead to a certain anxiety from the point of view of the driver. Specifically, on a road comprising a plurality of traffic lanes, when a vehicle in autonomous driving phase moving from upstream to downstream in the direction of travel is positioned on the leftmost lane for an observer facing downstream, for example in the case of overtaking a vehicle, the vehicle in autonomous driving phase may then appear to be too close to the vehicle being overtaken for the user of the autonomous vehicle, especially if the vehicle being overtaken weaves in its lane. In the same way, when the vehicle in autonomous driving phase is positioned on the rightmost lane with respect to the same observer and is overtaken by another vehicle, the user of the autonomous vehicle may also feel that he is too close to this other vehicle.

Document U.S. Pat. No. 8,473,144 discloses a system for controlling the lateral positioning of a vehicle on its traffic lane that is based on identifying surrounding vehicles. More precisely, the system is designed to identify objects close to the vehicle and, for each identified object, estimate a time interval for which the vehicle and the object will be laterally adjacent, on the basis in particular of the respective speeds and directions of movement of the vehicle and of the object, and adjust the trajectory of the vehicle by taking into account a lateral safety distance to be maintained between the vehicle and the identified object for said time interval. However, this solution leads to continuous weaving of the vehicle in order to maintain the lateral safety distance. In particular, on road portions where traffic is dense, the vehicle may be subjected to numerous trajectory adjustments, thereby causing the vehicle to swing, which may also be a source of anxiety for the driver. Furthermore, this system is based entirely on the detection of objects moving close to the vehicle. In addition, apart from the position of the vehicle, it is necessary to measure its speed as well as several other parameters, such as for example the acceleration or the deceleration of the vehicle. This system is therefore relatively complex to implement.

The invention aims to propose a method for controlling the positioning of an autonomous vehicle in its traffic lane that is better suited to the needs in particular in terms of safety and comfort of users in a real driving situation, in particular in the presence of other vehicles likely to be located laterally adjacent to the autonomous vehicle, and which is easy to implement.

To this end, the invention relates to a method for controlling the positioning of a motor vehicle traveling on a road comprising a plurality of traffic lanes laterally delimited by ground marking lines, characterized in that it comprises the following steps:
receiving a signal from at least one camera fitted to the vehicle,
analyzing said signal generated by the camera so as to detect said ground marking lines,
identifying, in accordance with a predefined classification of the types of ground marking lines, the type of detected ground marking lines laterally delimiting the current traffic lane of the vehicle,
determining features of the current traffic lane of the vehicle on the basis of the identification of the type of ground marking lines that delimit it, and,
if the traffic lane has the feature of being among at least a leftmost traffic lane and a rightmost traffic lane for an observer facing in the direction of travel of the vehicle, controlling the positioning of the vehicle in its current traffic lane so as to shift the vehicle in the direction of the distal edge of the road with respect to the central axis of the traffic lane of the vehicle.

By virtue of this approach, it is possible to control the lateral positioning of the vehicle in its traffic lane by adopting appropriate positioning in the lane and by keeping the same trajectory to be followed for the vehicle, whatever the objects present in the surroundings of the vehicle, in particular other vehicles moving nearby. In addition, the method of the invention requires only the use of a camera that is already present in the majority of vehicles and for which the use of signals in order to implement the method is purely algorithmic, this being particularly advantageous in terms of ease of implementation and cost.

Advantageously, if the current traffic lane has the feature of being a central traffic lane, the method comprises a step of controlling the positioning of the vehicle in its traffic lane so as to center the vehicle with respect to the central axis of the traffic lane of the vehicle.

Advantageously, the method comprises a step of maintaining a predetermined offset distance between the vehicle and the detected ground marking line located on the side of the distal edge of the road.

Preferably, said offset distance may be settable on the basis of the speed of the vehicle.

Advantageously, said offset distance is reduced at low speeds, preferably for speeds of the vehicle less than or equal to around 20 m/s.

Preferably, said offset distance is equal to a fraction of a safety distance defined by the difference between the width of the current traffic lane of the vehicle and the width of the vehicle.

Advantageously, the width of the current traffic lane of the vehicle is determined on the basis of the relative position of the detected ground marking lines that laterally delimit the traffic lane of the vehicle.

Advantageously, the predefined classification of the types of ground marking lines includes information about the continuous or discontinuous nature of the line segments forming the ground marking lines, about the length of the line segments and about the interval between the line segments.

The invention also relates to a device for controlling the positioning of a motor vehicle traveling on a road comprising a plurality of traffic lanes laterally delimited by ground marking lines, characterized in that it comprises an input interface designed to be coupled to at least one camera fitted to the vehicle and at least one processing unit designed to implement the steps of the method as described above.

The invention also relates to a motor vehicle, characterized in that it comprises at least one camera and a device as described above.

Figure 2:
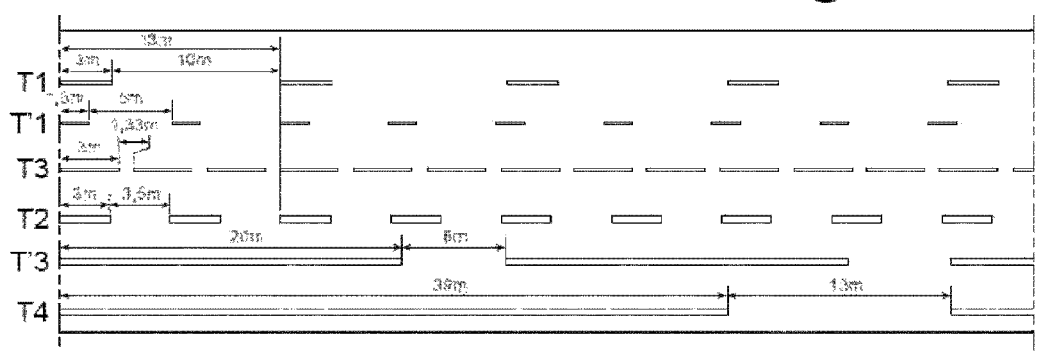
Figure 3:
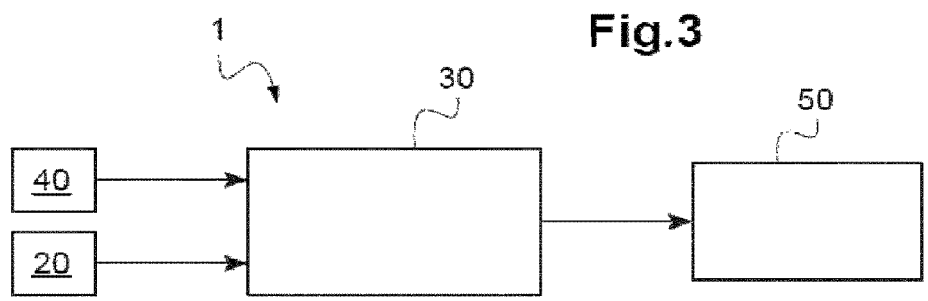

Other features and advantages of the invention will become apparent from the description thereof given below, by way of indication and without any limitation, with reference to the appended drawings, in which:

FIG. 1 schematically illustrates one exemplary implementation of the control method for the positioning of a vehicle on its traffic lane, for various scenarios;

FIG. 2 schematically illustrates one example of various types of ground marking lines likely to laterally delimit traffic lanes;

FIG. 3 schematically illustrates the control device according to the invention;

FIG. 4 illustrates one example of offset of the vehicle in a traffic lane on the basis of the speed of the vehicle.

FIG. 1 shows part of a road 1 comprising, in this example, three traffic lanes, respectively a lane located furthest to the right, called right-hand lane 11, a central lane 12 and a lane located furthest to the left, called left-hand lane 13, the right-hand lane 11 being located on the right-hand bank of the central lane 12 with respect to an observer facing downstream in the direction of travel and the left-hand lane 13 being located on the left-hand bank of the central lane 12 with respect to the same observer, and on which lanes the vehicle 10 moving from upstream to downstream is likely to travel. The road 1 having three traffic lanes according to the example of FIG. 1 is laterally delimited by two opposing distal edges, respectively a distal edge formed by a hard shoulder 14, which is located on the right-hand bank of the right-hand lane 11, and by a distal edge formed by a central reservation 15, which is located on the left-hand bank of the left-hand lane 13. Moreover, each of the traffic lanes 11, 12 and 13 of the road 1 is laterally delimited to the left and to the right by ground marking lines 16.

The starting point is the observation that, depending on the type of ground marking lines that delimit each traffic lane, it is possible to determine the precise traffic lane in which the vehicle is situated. Based on this information, as will be explained in more detail hereinafter, the appropriate offset for shifting the vehicle to a greater or lesser extent in its lane will be provided so as to guarantee positioning of the vehicle that is able to promote acceptability of the autonomous mode to the user, specifically regardless of the objects present in the surroundings of the vehicle.

The invention therefore makes provision to detect the ground marking lines that are arranged laterally on either side of each of the traffic lanes in order to determine, from identifying these detected ground marking lines, the precise traffic lane on which the vehicle is situated. To this end, the vehicle 10 is equipped with a camera 20, for example situated toward the front of the vehicle. In this case, it is preferably arranged at the top of the windshield, at the join with the roof of the vehicle, so as to make it possible to observe the scene located in front of the vehicle. It is advantageously possible to use the frontal camera installed on the windshield of the vehicle with the associated image processing capabilities, as used for example by obstacle detection systems fitted to certain vehicles and used for the lateral control of the vehicle, such as the Mobileye® system.

FIG. 2 illustrates a classification of the various types of ground marking lines likely to laterally delimit traffic lanes. The specific features for distinguishing between the various known types of ground marking lines relate in particular to the continuous or discontinuous nature of the line segments forming these lines, to the length of the line segments, and to the interval between them. Thus, for a leftmost traffic lane located on the side of a central reservation delimiting the two directions of travel of a road, the ground marking line laterally delimiting this lane from the adjacent central reservation may be for example either a line consisting of discontinuous line segments each having a length of 3 m and a regular interval between them of 10 m, such as the line T1 in FIG. 2, or a line of continuous line segments. For a central lane, the ground marking line delimiting this lane on each side may consist for example of a discontinuous line such as the line T1, T'1 or T3 illustrated in FIG. 2. Lastly, for a rightmost traffic lane, located on the side of a hard shoulder, the ground marking line laterally delimiting this lane from the hard shoulder may for example consist of a discontinuous line such as the line T2, T'3 or T4 illustrated in FIG. 2. In other words, the classification makes it possible to determine a traffic lane from among a left-hand lane, a central lane or a right-hand lane, on the basis of the specific features of the various types of ground marking lines.

Thus, based on the signal generated by the camera housed on board at the front of the vehicle, image processing algorithms associated with the camera and known per se are used to identify the type of ground marking lines located to the left and to the right of the vehicle and, based on the classification of the types of ground marking lines, the traffic lane on which the vehicle is situated is determined from among the left-hand lane, the central lane or the right-hand lane.

Additionally, on the basis of the position of the ground marking lines detected by the camera on each side of the vehicle, the width L of the lane on which the vehicle is situated is determined. Based on the lane width thus determined, a safety distance is calculated, which will be used to position the vehicle in its traffic lane, as will be explained in detail below. This safety distance is preferably defined as being the difference between the lane width L determined from the signal generated by the camera and the width of the vehicle l, which is information that is known by the system. This safety distance information, as well as the information about the traffic lane of the vehicle as determined in the previous step from the signal generated by the camera, will then be used to control the positioning of the vehicle in its traffic lane.

FIG. 3 shows a device comprising means designed to implement the method according to one embodiment of the invention. The device 1 comprises a first processing unit 30, which receives the image signals from the camera 20 and is designed to execute an image processing operation in order to recognize and identify the types of ground marking lines. This image processing makes it possible, as explained above, to deduce therefrom the traffic lane on which the vehicle is situated, and also the width of this traffic lane and therefore the safety distance. The first processing unit 30 also receives signals provided by a sensor 40 designed to measure the speed of the vehicle. The first processing unit 30 may for example be the computer used in the on-board driving assistance system, commonly called ADAS (acronym for Advanced Driver Assistance System), fitted to the vehicle.

Generally speaking, if it becomes apparent from using the image signals and from identifying the types of ground marking lines that the vehicle is situated on the leftmost traffic lane or the rightmost traffic lane of the road, then the first processing unit 30 is designed to control the positioning of the vehicle in the lane, so as to shift the vehicle in the direction of the distal edge of the road with respect to the central axis of the lane. In this case, the positioning of the vehicle in its lane is controlled so as to decenter the vehicle in its lane by keeping an offset distance between the vehicle and the ground marking line that is located on the side of the distal edge of the road substantially constant, this offset distance preferably being equal to a fraction of the previously calculated safety distance.

On the other hand, if the traffic lane on which the vehicle is situated is determined as being the central traffic lane, then the first processing unit 30 is designed to control the positioning of the vehicle so as to center the vehicle in the traffic lane.

To control the positioning of the vehicle, the first processing unit 30 cooperates with a second processing unit 50, which is for example the computer responsible for the electrically assisted steering of the vehicle. This computer receives control orders from the first processing unit 30 to act on the steering of the vehicle so as to shift or center the vehicle in its traffic lane, depending on the scenarios explained above.

Thus, according to the example of FIG. 1, if the vehicle 10 is traveling on the right-hand lane 11, the positioning of the vehicle is controlled so as to decenter the vehicle in the lane 11 in the direction of the distal edge of the road, formed here by the hard shoulder 14, and to keep the vehicle at an offset distance D with respect to the ground marking line 16 located on the side of the hard shoulder 14, the offset distance D being for example chosen to be equal to ⅓ of the safety distance. In this case, the distance between the vehicle 10 and the opposing ground marking line 16, delimiting the right-hand lane 11 with respect to the adjacent central lane 12, is kept at ⅔ of the safety distance.

In the same way, if the vehicle 10 is traveling on the left-hand lane 13, the positioning of the vehicle is controlled so as to decenter the vehicle in the lane 11 in the direction of the distal edge of the road, formed here by the central reservation 15, and to keep the vehicle at an offset distance D, for example chosen to be equal to ⅓ of the safety distance, with respect to the ground marking line 16 located on the side of the central reservation 15. Thus, the distance between the vehicle 10 and the opposing ground marking line 16, delimiting the left-hand lane 13 with respect to the adjacent central lane 12, is kept at ⅔ of the safety distance.

Finally, if the vehicle is traveling on the central lane 12, the positioning is controlled so as to situate the vehicle in the center of the lane and to keep the vehicle at an offset distance D corresponding to half the safety distance with respect to each of the ground marking lines 16 delimiting the central traffic lane 12 on each side.

This strategy makes it possible to adjust the positioning of the vehicle in its traffic lane, independently of the other vehicles moving nearby, thereby allowing flexible driving without excessive trajectory variations. Furthermore, regardless of the traffic lane of the vehicle, the offset distance imposed by controlling the positioning of the vehicle makes it possible to leave a sufficient and acceptable safety margin with respect to another vehicle, overtaking or being overtaken, located in an adjacent lateral region close to the vehicle. This margin, imposed by the offset distance, makes it possible to promote acceptability of driving the vehicle in autonomous mode to the user, while at the same time guaranteeing safety.

According to one particular embodiment, there may be provision, when the vehicle is located in the left-hand lane, that is to say the lane adjacent to the central reservation, or the right-hand lane, that is to say the lane adjacent to the hard shoulder, for the offset distance of the vehicle in its lane to be settable on the basis of the speed of the vehicle. In particular, at low speeds, typically for vehicle speeds less than approximately 20 m/s, there is provision to shift the vehicle further in the direction of the ground marking line located on the side of the edge of the road, in other words to reduce the offset distance to be maintained with respect to this line. This strategy makes it possible to leave a larger clearance for bikers to pass, for example.

FIG. 4 illustrates one example of controlling the positioning of the vehicle in its traffic lane on the basis of the speed of the vehicle. In this example, the vehicle has a width equal to 2.128 m and is traveling in the left-hand lane, said lane having a width of 3.50 m. There is therefore a safety distance equal to 1.372 m. According to this example, for vehicle speeds less than 20 m/s, the offset distance of the vehicle with respect to the ground marking line laterally delimiting the left-hand lane is set at ¼ of the safety distance, that is to say 0.34 m, and then, for speeds of between substantially 20 m/s and 40 m/s, this offset distance is increased to ⅓ of the safety distance, that is to say 0.46 m, and lastly, for speeds greater than 40 m/s, this offset distance is set to half the safety distance, that is to say 0.69 m in this example.

The invention claimed is:

1. A method for controlling a positioning of a motor vehicle traveling on a road comprising a plurality of traffic lanes that are laterally delimited by ground marking lines, the method comprising:
   receiving a signal from a camera fitted on the vehicle;
   analyzing said signal generated by the camera so as to detect particular ground marking lines;
   identifying, in accordance with a predefined classification of types of ground marking lines, a type of the detected particular ground marking lines laterally delimiting a current traffic lane of the vehicle;
   determining an identity of the current traffic lane of the vehicle based on the identified type of the detected particular ground marking lines that delimit the current traffic lane;
   in response to determining that the current traffic lane is a leftmost traffic lane with respect to an observer facing in a direction of travel of the vehicle, controlling the positioning of the vehicle to remain within the current traffic lane but to decenter the vehicle by shifting the vehicle to travel at a predetermined offset distance from a left edge of the road; and
   in response to determining that the current traffic lane is a rightmost traffic lane, controlling the positioning of the vehicle to remain within the current traffic lane but to decenter the vehicle by shifting the vehicle to travel at the predetermined offset distance from a right edge of the road.

2. The method as claimed in claim 1, wherein, in response to determining that the current traffic lane is a central traffic lane, the method further comprises controlling the positioning of the vehicle to remain within the current traffic lane but to center the vehicle with respect to the central axis of the current traffic lane of the vehicle.

3. The method as claimed in claim 1, further comprising maintaining the predetermined offset distance between the vehicle and one of the detected particular ground marking lines located on a side of a distal edge of the road.

4. The method as claimed in claim 3, further comprising setting the offset distance based on a speed of the vehicle.

5. The method as claimed in claim 4, further comprising reducing the offset distance at speeds below a threshold speed.

6. The method as claimed in claim 4, further comprising reducing the offset distance when a speed of the vehicle is less than or equal to 20 m/s.

7. The method as claimed in claim 3, further comprising setting the offset distance equal to a fraction of a safety distance defined by a difference between a width of the current traffic lane of the vehicle and a width of the vehicle.

8. The method as claimed in claim 7, further comprising determining the width of the current traffic lane of the vehicle based on a relative position of the detected ground marking lines that laterally delimit the current traffic lane of the vehicle.

9. The method as claimed in claim 1, wherein the predefined classification of the types of ground marking lines includes information about a continuous or discontinuous nature of line segments forming the ground marking lines, about a length of the line segments and about an interval between the line segments.

10. A device for controlling a positioning of a motor vehicle traveling on a road comprising a plurality of traffic lanes that are laterally delimited by ground marking lines, the device comprising:
   circuitry configured to
      receive a signal from a camera fitted on the vehicle;
      analyze the signal generated by the camera so as to detect particular ground marking lines;
      identify, in accordance with a predefined classification of types of ground marking lines, a type of the detected particular ground marking lines laterally delimiting a current traffic lane of the vehicle;
      determine an identity of the current traffic lane of the vehicle based on the identified type of the detected particular ground marking lines that delimit the current traffic lane;
      in response to determining that the current traffic lane is a leftmost traffic lane with respect to an observer facing in a direction of travel of the vehicle, control the positioning of the vehicle to remain within the current traffic lane but to decenter the vehicle by shifting the vehicle to travel at a predetermined offset distance from a left edge of the road; and
      in response to determining that the current traffic lane is a rightmost traffic lane, control the positioning of the vehicle to remain within the current traffic lane but to decenter the vehicle by shifting the vehicle to travel at the predetermined offset distance from a right edge of the road; and
   an input interface configured to be coupled to the camera, which is fitted to the vehicle.

11. A motor vehicle, comprising:
the camera; and
the device as claimed in claim 10.

12. The method of claim 1, wherein the controlling of the position of the vehicle comprises controlling the position of the vehicle based on the identified current traffic lane independently of other vehicles travelling on the road.

* * * * *